(12) United States Patent
Kilibarda et al.

(10) Patent No.: US 6,948,227 B2
(45) Date of Patent: Sep. 27, 2005

(54) FRAMING STATION HAVING SELF PIERCING RIVETS AND METHOD

(75) Inventors: Velibor Kilibarda, Birmingham, MI (US); Michael R. Dugas, Brighton, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/881,523

(22) Filed: Jun. 30, 2004

(65) Prior Publication Data

US 2004/0261242 A1 Dec. 30, 2004

Related U.S. Application Data

(60) Provisional application No. 60/483,884, filed on Jun. 30, 2003.

(51) Int. Cl.[7] .............................. B21D 39/03; B23P 21/00
(52) U.S. Cl. ............................................ 29/430; 29/783
(58) Field of Search ............................... 29/429, 525.07, 29/525.02, 525.06, 700, 430, 432.2, 464, 783, 787, 795, 281.1; 296/203.01, 204

(56) References Cited

U.S. PATENT DOCUMENTS

| | | | |
|---|---|---|---|
| 4,489,976 A | * 12/1984 | Flaherty | ................ 296/203.01 |
| 5,177,862 A | 1/1993 | Speece | |
| 5,204,942 A | 4/1993 | Otera et al. | |
| 5,265,317 A | 11/1993 | Angel | |
| 5,409,158 A | 4/1995 | Angel | |
| 5,427,300 A | 6/1995 | Quagline | |
| 5,479,698 A | 1/1996 | Angel | |
| 5,729,463 A | 3/1998 | Koenig et al. | |
| 5,752,305 A | 5/1998 | Cotterill et al. | |
| 5,779,127 A | 7/1998 | Blacket et al. | |
| 5,813,114 A | 9/1998 | Blacket et al. | |
| 5,884,386 A | 3/1999 | Blacket et al. | |
| 5,913,421 A | 6/1999 | Shinjo | |
| 6,089,437 A | 7/2000 | Blacket et al. | |
| 6,116,835 A | 9/2000 | Blacket et al. | |
| 6,378,186 B1 | * 4/2002 | Angel | ....................... 29/281.1 |
| 6,493,930 B1 | 12/2002 | Raami | |
| 6,543,115 B1 | 4/2003 | Mauer et al. | |
| 6,564,440 B2 | 5/2003 | Oldford et al. | |
| 6,591,488 B1 | 7/2003 | Tachibana | |
| 6,595,407 B2 | * 7/2003 | McNamara et al. | ........ 228/212 |
| 2002/0029450 A1 | 3/2002 | Kondo | |
| 2002/0072825 A1 | 6/2002 | Angel | |
| 2002/0148089 A1 | 10/2002 | Frenken | |
| 2002/0162209 A1 | 11/2002 | Hosono et al. | |
| 2002/0166221 A1 | 11/2002 | Clew | |
| 2003/0000802 A1 | 1/2003 | Oldford et al. | |
| 2003/0046039 A1 | 3/2003 | Donovan | |
| 2003/0046804 A1 | 3/2003 | Donovan | |
| 2003/0074102 A1 | 4/2003 | Mauer et al. | |

* cited by examiner

*Primary Examiner*—John C. Hong
(74) *Attorney, Agent, or Firm*—Young & Basile, P.C.

(57) ABSTRACT

An apparatus and process for assembling individual body components of a body-in-white vehicle with respect to one another to form a unitary vehicle body including a framing workstation for receiving and positionally locating an underbody member of the vehicle, and for receiving and positionally locating at least one upper body member of the vehicle with respect to the underbody member. The framing workstation establishing a predetermined geometry of the individual body components, while forming the unitary vehicle body. At least one self-piercing rivet tool for securing the at least one upper body member of the vehicle to the underbody member of the vehicle to form and maintain the predetermined geometry of the unitary vehicle body with self-piercing rivets.

26 Claims, 2 Drawing Sheets

FRAMING STATION HAVING SELF PIERCING RIVETS AND METHOD

CROSS-REFERENCE TO RELATED APPLICATIONS

This application is a continuation of and claims the benefit of U.S. patent application Ser. No. 06/483,884 filed on Jun. 30, 2003.

FIELD OF THE INVENTION

The present invention relates to an automotive framing workstation on an assembly line for framing an automotive body having a plurality of panels with respect to one another using self piercing rivets.

BACKGROUND OF THE INVENTION

Self piercing rivets and associated tools for fastening two or more pieces of material with respect to one another are generally known. See U.S. Pat. No. 5,752,305: U.S. Pat. No. 5,779,127; U.S. Pat. No. 5,813,114; U.S. Pat. No. 5,884,386; U.S. Pat. No. 6,089,437; and U.S. Pat. No. 6,116,835. Self piercing rivets have typically been used in non critical connections attaching two or more pieces of material with respect to one another.

SUMMARY OF THE INVENTION

It would be desirable in the present invention to assemble an automotive body at a framing station using self piercing rivets rather than spot welding the major panels with respect to one another. It is believed that self piercing rivets can provide a connection between the components of the automotive vehicle uni-body frame substantially equivalent to spot welding attachment of the frame components to one another as is commonly practiced in the industry today. Further, it is believed that use of self piercing rivets can result in increased productivity, increased flexibility, and reduced cost for the production of automotive bodies through the framing station according to the present invention.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
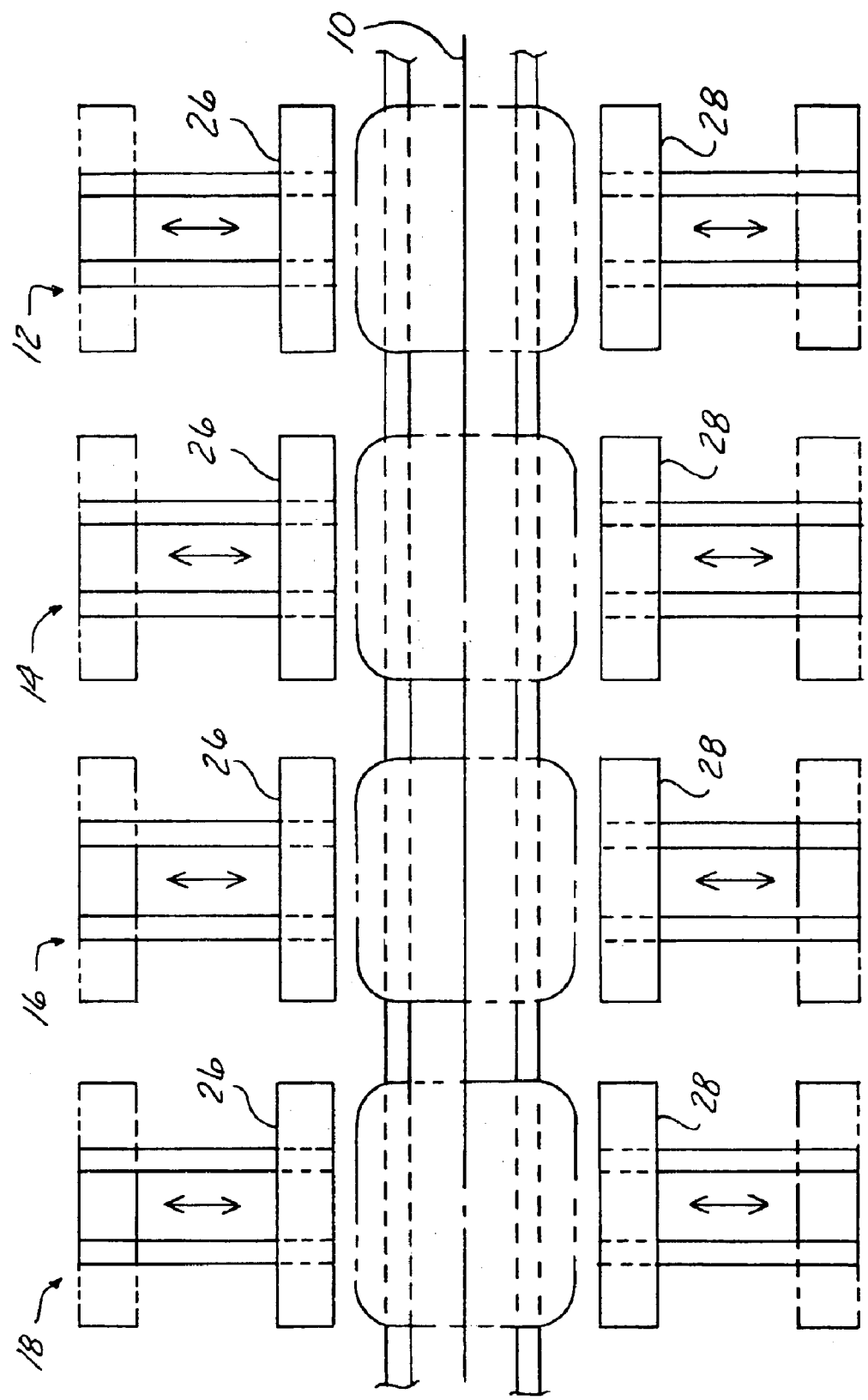
FIG. 1 is a simplified schematic view of an automotive assembly line according to the present invention having four workstations.
Figure 2:
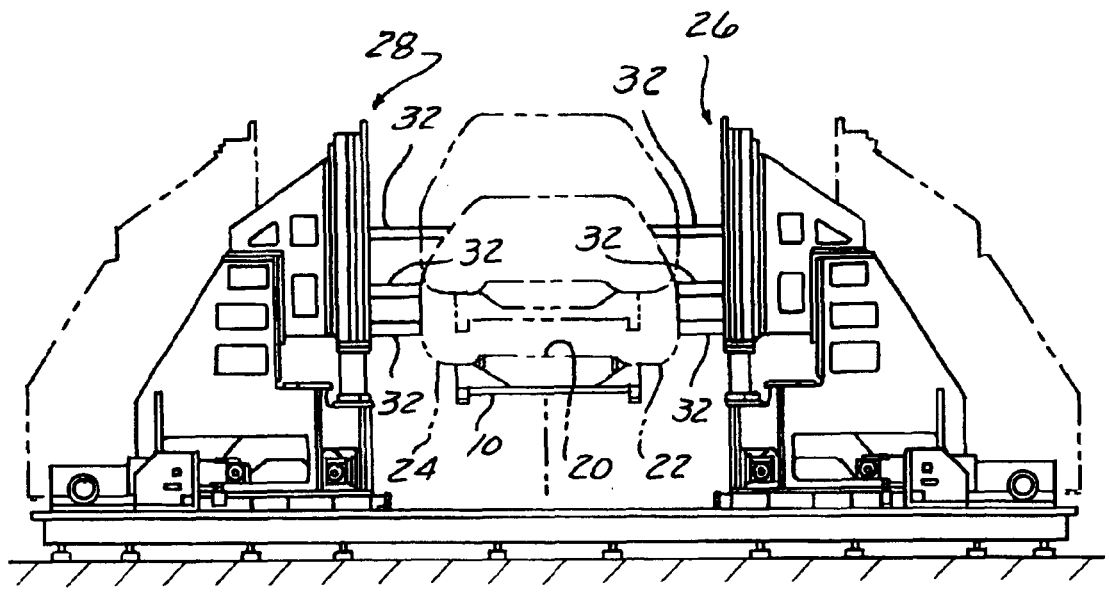
FIG. 2 is a simplified schematic end elevational view of one of the workstations.

Referring now to FIG. 1, an automotive assembly line can include an underbody delivery system. The automotive assembly line 10 passes through four schematically illustrated workstations 12, 14, 16, 18. According to the present invention, each of the four workstations can be configured for a different automotive body style enabling four different body styles to be handled by the automotive assembly line 10. Alternatively, a single body style can pass through one or more of the workstations for receiving different assembly processing at the sequential workstations. The underbody 20 of the motor vehicle can be delivered to the appropriate workstation 12, 14, 16, or 18, by any appropriate transport system, such as by a pallet delivery system, or overhead delivery system. Right and left body side panels 22, 24 can be delivered to the workstation by any appropriate delivery system, such as an overhead conveyor system to be positioned with respect to the underbody 20. The body side panels 22, 24 can either be handled by robotic manipulators for accurate positioning with respect to the underbody 20, or can be clamped to geometry fixtures associated with transversely movable frame members 26, 28 for movement and positioning relative to the underbody 20 at the workstation. Referring now to FIGS. 1 and 2, the transversely movable frame members 26, 28 can support either or both of the side body panels 22, 24, and/or can support one or more self piercing rivet tools for engagement with the side body panels 22, 24. The side body panels 22, 24 can be manually loaded into a geometry fixture associated with the movable frame members 26, 28 and/or can be loaded with automated equipment, by way of example and not limitation, by robots having side panel manipulators for holding the side panel for loading into the geometry fixture associated with the movable frame members 26, 28. Alternatively, a robot can position at least one upper body member with respect to the underbody, or at least one upper body member can be loaded into a geometry fixture associate with the movable frame members 26, 28, and/or a second upper body member, by way of example and not limitation, such as a roof header can be held in position by a robot during fastening with self-piercing rivets, or any combination of the two. Since self riveting tooling is appreciable smaller than welding guns, additional tooling can be located on each frame to increase the total number of attachment points per workstation and to reduce cycle time since additional time for movement of the robotically manipulated weld gun from point to point is no longer required at the self piercing rivet assembly workstation. Even if a robotically manipulated self piercing rivet tool is required, the total number of attachment points to be serviced by the robotically manipulated self piercing riveting tool is dramatically reduced in order to decrease cycle time at the workstation.

Figure 3:
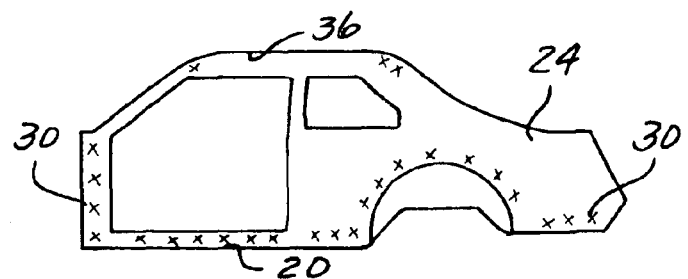
FIG. 3 is a simplified schematic view of an automotive body assembled with self piercing rivets according to the present invention.

Referring now to FIG. 3, a simplified schematic side elevational view of a side body panel is illustrated. The side body panel 24 is a mirror image of the side panel body 22 at various locations for self piercing rivet assembly are shown with marks labeled 30. It is believed that 10 to 15 self piercing rivet connections can be made between the corresponding side panel 22, 24 and the underbody 20 at each workstation. A substantial portion of the self piercing riveting connections can be made simultaneously from tooling connected to the movable frames 26, 28.

Figure 4:
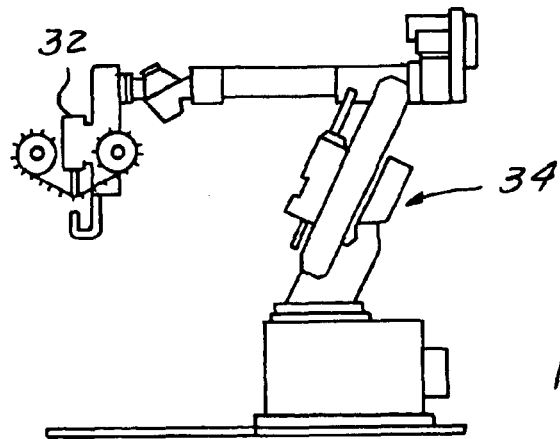
FIG. 4 is a simplified schematic view of a self piercing rivet tool attached to a robotic arm.

Referring now to FIG. 4, if a robotically manipulated self piercing riveting tool 32 is required, multiple self piercing rivet connections can be made between the corresponding side body panel 22, 24 and the underbody 20 with the same tool 32 being manipulated by the robotic arm 34. Self piercing riveting tools can also be used to connect the header or roof assembly 36 to the side body panels 22, 24. The elimination of robotically manipulated weld guns greatly simplifies the configuration of the movable frame system, since the self piercing riveting tooling is appreciably smaller than the weld guns, requires less clearance, and permits mounting of a substantial number of self piercing riveting tools directly to the frame assembly.

According to the present invention, the underbody, side panels, and/or roof assembly can be toy tabbed together prior to entering the framing workstation. The toy tab configuration can be accomplished either manually or robotically. Alternatively, the side panel members can be robotically loaded directly into the workstation gate equipped with self piercing riveting tools to assembly the side panels to the underbody and to assemble the roof to the side panels. In this configuration the robots are used for material handling only in order to simplify the workstation configuration. It is believed that an automotive assembly line according to the present invention can operate 200 jobs per hour with 10 to 15 self piercing rivet guns per workstation frame. Each self piercing rivet tool can be supplied with a strip of self piercing rivets having 5000 to 6000 fasteners. Approximately 1000 to 1200 rivets would be performed per tool per day requiring reloading of the rivet tools with new strips of self piercing rivets on a weekly basis.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for assembling individual contoured body components of a body-in-white vehicle with respect to one another to form a unitary vehicle body comprising:
   a framing workstation for receiving and positionally locating an underbody contoured member of the vehicle, and for receiving and positionally locating at least one contoured upper body member of the vehicle with respect to the underbody member, the framing workstation for establishing a predetermined geometry of the individual contoured body components while forming the unitary vehicle body; and
   at least one self-piercing rivet tool for securing the at least one contoured upper body member of the vehicle to the underbody contoured member of the vehicle to form and maintain the predetermined geometry of the unitary vehicle body with self-piercing rivets.

2. The apparatus of claim 1, wherein the at least one upper body member of the vehicle further comprises:
   a left-hand bodyside panel and a tight-hand bodyside panel of the vehicle to be received and positionally located with respect to the underbody member.

3. The apparatus of claim 2, wherein the at least one upper body member further comprises:
   a header member extending between the left-hand bodyside panel and the right-hand bodyside panel of the vehicle spaced vertically from the underbody member, the header member to be received and positionally located with respect to the left-hand bodyside panel and the right-hand bodyside panel of the vehicle at the framing station, and while being connected with respect to one another with self-piercing rivets.

4. The apparatus of claim 1, wherein the underbody member further comprises a floor pan of the vehicle to be received and positionally located with respect to the upper body member of the vehicle.

5. The apparatus of claim 1 further comprising:
   a robot located at the framing station for receiving and positionally locating the at least one upper body member with respect to the underbody member of the vehicle.

6. The apparatus of claim 5 further comprising:
   the at least one geometry fixture defined by at least one frame transversely moveable between a part-loading position, where the at least one upper body member of the vehicle can be loaded into the geometry fixture, and a vehicle-framing position, where the at least one upper body member can be held in the predetermined geometry with respect to the underbody member to form the unitary vehicle body.

7. The apparatus of claim 6 further comprising:
   at least one self-piercing rivet tool connected to the at least one frame for securing the at least one upper body member of the vehicle to the underbody member of the vehicle to form and maintain the predetermined geometry of the unitary vehicle body with self piercing rivets.

8. The apparatus of claim 1 further comprising:
   at least one geometry fixture located at the framing station for receiving and positionally locating the at least one upper body member with respect to the underbody member of the vehicle.

9. The apparatus of claim 1 further comprising:
   a robot located at the framing workstation having a self-piercing rivet tool for securing the at least one upper body member of the vehicle to the underbody member of the vehicle to form and maintain the predetermined geometry of the unitary vehicle body with self-piercing rivets.

10. The apparatus of claim 1 further comprising:
    a robot located at the framing workstation having a self-piercing rivet tool for securing the at least one upper body member of the vehicle to the underbody member of the vehicle to form and maintain the predetermined geometry of the unitary vehicle body with self-piercing rivets; and
    at least one self-piercing rivet tool connected to at least one frame for securing the at least one upper body member of the vehicle to the underbody member of the vehicle to form and maintain the predetermined geometry of the unitary vehicle body with self-piercing rivets.

11. The apparatus of claim 1 further comprising:
    the underbody member and the at least one upper body member toy tabbed together prior to entering the framing workstation.

12. The apparatus of claim 1 further comprising:
    a plurality of framing workstations, each framing workstation for receiving and positionally locating the underbody member of the vehicle for a different automotive body style, and for receiving and positionally locating the at least one upper body member of the vehicle with respect to the underbody member for the different automotive body style, the framing workstation for establishing the predetermined geometry of the individual body components while forming the unitary vehicle body of the particular automotive body style to be assembled.

13. The apparatus of claim 1 further comprising:
    a plurality of framing workstations, each framing workstation for sequentially receiving and positionally locating the underbody member of the vehicle, and for receiving and positionally locating at least one upper body member of the vehicle with respect to the underbody member, the framing workstation for establishing a predetermined geometry of the individual body components while sequentially performing assembling processes on the unitary vehicle body.

14. A process for assembling individual contoured body components of a body-in-white vehicle with respect to one another to form a unitary vehicle body comprising the steps of:

receiving and positionally locating an underbody contoured member of the vehicle at a framing workstation;

receiving and positionally locating at least one contoured upper body member of the vehicle with respect to the underbody member at the framing workstation;

establishing a predetermined geometry of the individual contoured body components while forming the unitary vehicle body at the framing workstation; and securing the at least one contoured upper body member of the vehicle to the underbody contoured member of the vehicle with at least one self-piercing rivet tool to form and maintain the predetermined geometry of the unitary vehicle body with self-piercing rivets.

15. The process of claim 14, wherein the receiving and positionally locating at least one upper body member of the vehicle step further comprises the step of:

receiving and positionally locating a left-hand bodyside panel and a right-hand bodyside panel of the vehicle with respect to the underbody member.

16. The process of claim 15 wherein the receiving and positionally locating at least one upper body member step further comprises the step of:

receiving and positionally locating a header member extending between the left-hand bodyside panel and the right-hand bodyside panel of the vehicle, and spaced vertically from the underbody member; and connecting the header member with respect o the left-hand bodyside panel and the right-band bodyside panel with self-piercing rivets.

17. The process of claim 14, wherein the receiving and positionally locating the underbody member further comprises the step of:

receiving and positionally locating a floor pan of the vehicle with respect to the upper body member of the vehicle.

18. The process of claim 14, wherein the receiving and positionally locating at least one upper body member step further comprises the step of:

receiving and positionally locating the at least one upper body member with respect to the underbody member of the vehicle with a robot located at the framing station.

19. The process of claim 14, wherein the receiving and positionally locating at least one upper body member further comprises the step of:

receiving and positionally locating the at least one upper body member with respect to the underbody member of the vehicle with at least one geometry fixture located at the framing station.

20. The process of claim 19 farther comprising the steps of:

transversely moving the at least one geometry fixture defined by at least one frame between a part-loading position, where the at least one upper body member of the vehicle can be loaded into the geometry fixture, and a vehicle-framing position, where the at least one upper body member can be held in the predetermined geometry with respect to the underbody member to form the unitary vehicle body.

21. The process of claim 20 further comprising the steps of:

connecting at least one self-piercing rivet tool to the at least one frame; and securing the at least one upper body member of the vehicle to the underbody member of the vehicle to form and maintain the predetermined geometry of the unitary vehicle body with self-piercing rivets.

22. The process of claim 14 further comprising the steps of:

locating a robot at the framing workstation having a self-piercing rivet tool; and securing the at least one upper body member of the vehicle to the underbody member of the vehicle to form and maintain the predetermined geometry of the unitary vehicle body with self-piercing rivets.

23. The process of claim 14 further comprising the steps of:

locating a robot as the framing workstation having a self-piercing rivet tool;

connecting at least one self-piercing rivet tool to at least one reciprocal geometry fixture frame; and securing the at least one upper body member of the vehicle to the underbody member of the vehicle with the self-piercing rivet tool carried by the robot and with the at least one self-piercing rivet tool connected to the geometry fixture frame to form and maintain the predetermined geometry of the unitary vehicle body with self-piercing rivets.

24. The process of claim 14 further comprising the step of:

toy tabbing the underbody member and the at least one upper body member together prior to delivery to the framing workstation.

25. The process of claim 14 further comprising the step of:

processing a plurality of different automotive body styles through a plurality of framing workstations, each framing workstation for receiving and positionally locating the underbody member of the vehicle for a different automotive body style, and for receiving and positionally locating the at least one upper body member of the vehicle with respect to the underbody member for the particular corresponding different automotive body style, the framing workstation for establishing the predetermined geometry of the individual body components while forming the unitary vehicle body of the particular automotive body style to be assembled.

26. The process of claim 14 further comprising the step of:

processing the at least one upper body member and underbody member through a plurality of framing workstations, each framing workstation for sequentially receiving and positionally locating the underbody member of the vehicle, and for receiving and positionally locating the at least one upper body member of the vehicle with respect to the underbody member, each framing workstation for establishing a predetermined geometry of the individual body components while sequentially performing assembling processes on the unitary vehicle body.

* * * * *